United States Patent
Angelo et al.

(10) Patent No.: US 10,971,177 B1
(45) Date of Patent: Apr. 6, 2021

(54) HEAT-ASSISTED MAGNETIC RECORDING DEVICE WITH MULTIPLE WRITERS THAT WRITE TO THE SAME DISK SURFACE AT DIFFERENT TIME PERIODS

(71) Applicant: Seagate Technology LLC, Fremont, CA (US)

(72) Inventors: James E. Angelo, Savage, MN (US); Mehmet Fatih Erden, St. Louis Park, MN (US); John W. Dykes, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/887,007

(22) Filed: May 29, 2020

(51) Int. Cl.
  *G11B 21/02* (2006.01)
  *G11B 5/596* (2006.01)
  *G11B 5/54* (2006.01)
  *G11B 5/48* (2006.01)
  *G11B 13/08* (2006.01)
  *G11B 5/02* (2006.01)
  *G11B 5/00* (2006.01)

(52) U.S. Cl.
  CPC .............. *G11B 5/4813* (2013.01); *G11B 5/02* (2013.01); *G11B 13/08* (2013.01); *G11B 2005/0021* (2013.01)

(58) Field of Classification Search
  CPC ..... G11B 5/54; G11B 5/59638; G11B 5/5965; G11B 5/59655; G11B 5/59661; G11B 5/59666; G11B 5/10; G11B 5/00826; G11B 5/484; G11B 5/00
  USPC .................. 360/75; 369/13.33, 13.32, 13.24
  See application file for complete search history.

(56) References Cited

U.S. PATENT DOCUMENTS

| 8,982,678 B2 * | 3/2015 | Gage .................... G11B 5/5965 369/13.33 |
| 9,607,641 B1 | 3/2017 | Ramakrishnan et al. |
| 10,002,625 B1 | 6/2018 | Erden |
| 10,210,891 B1 | 2/2019 | Tian et al. |

* cited by examiner

*Primary Examiner* — Nabil Z Hindi
(74) *Attorney, Agent, or Firm* — Mueting Raasch Group

(57) ABSTRACT

A first heat-assisted magnetic recording (HAMR) writer writes to a surface of a magnetic disk using during an initial time period. A second HAMR writer is configured to write to the surface but not during the initial time period. The initial time period extends from a first time when the disk drive is first used to a second time when a near-field transducer of the first HAMR writer reaches a first wear threshold. During a subsequent time period after the initial time period, to the surface of the disk is written to using the second HAMR writer and not the first HAMR writer.

20 Claims, 6 Drawing Sheets

US 10,971,177 B1

HEAT-ASSISTED MAGNETIC RECORDING DEVICE WITH MULTIPLE WRITERS THAT WRITE TO THE SAME DISK SURFACE AT DIFFERENT TIME PERIODS

SUMMARY

The present disclosure is directed to a heat-assisted magnetic recording device with multiple writers that write to the same disks surface at different time periods. In one embodiment, a first heat-assisted magnetic recording (HAMR) writer writes to a surface of a magnetic disk using during an initial time period. A second HAMR writer is configured to write to the surface but not during the initial time period. The initial time period extends from a first time when the disk drive is first used to a second time when a near-field transducer of the first HAMR writer reaches a first wear threshold. During a subsequent time period after the initial time period, to the surface of the disk is written to using the second HAMR writer and not the first HAMR writer.

In another embodiment, an apparatus includes channel circuitry operable to communicate with first and second heat-assisted magnetic recording (HAMR) writers that are configured to write to a same surface of a magnetic disk. A controller is coupled to the channel circuitry and operable to write to the surface of the magnetic disk using the first HAMR writer during an initial time period. The second HAMR writer does not write to the surface during the initial time period. The starting time period extends from a first time when the apparatus is first used to a second time when a near-field transducer of the first HAMR writer reaches a first wear threshold. During a subsequent time period after the initial time period, the disk is written to using the second HAMR writer and not the first HAMR writer.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
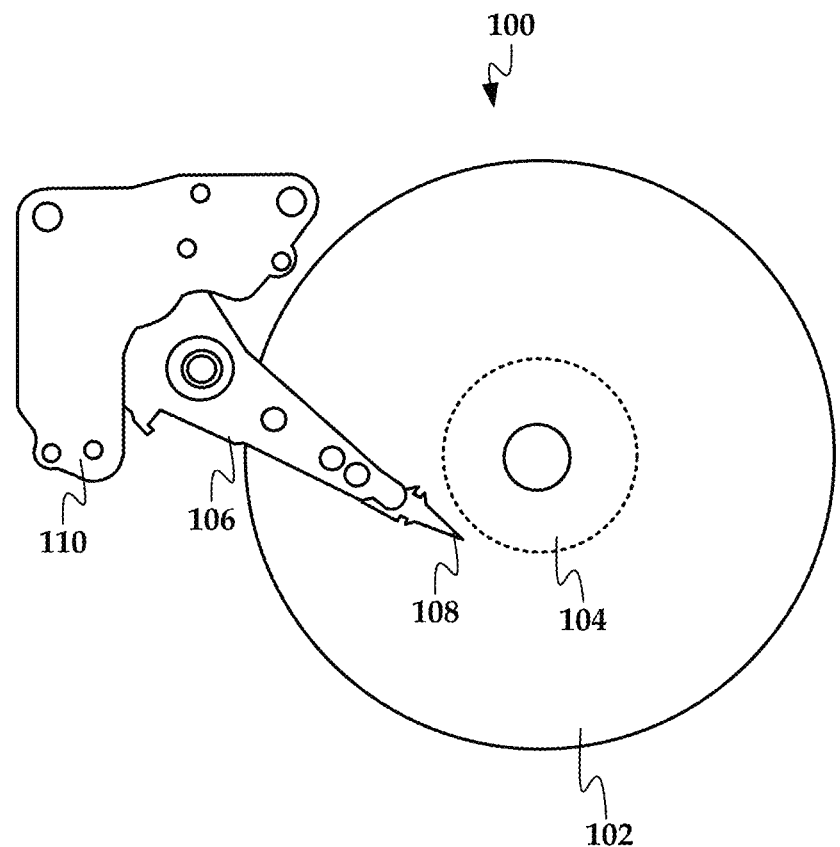
FIG. 1 is a plan view of parts of a disk drive apparatus according to an example embodiment.

The present disclosure generally relates to magnetic disk drive storage. While newer technologies such as solid-state drives (SSD) are gaining in popularity, there are still a number of applications where traditional magnetic disk storage, or hard disk drive (HDD), is preferable. For example, the cost per unit of data stored for HDD storage is much lower than in technologies such as SSD. For some applications such as data centers, the combination of low cost and high capacity makes the HDD a preferred option for a majority of the total storage capacity. As such, hard drive manufacturers are attempting to further increase areal density (ADC) of disk storage to maintain this cost advantage, while also increasing performance, e.g., data throughput.

In order to increase ADC in magnetic storage, some drives utilize a technology known as heat-assisted magnetic recording (HAMR). Generally, a HAMR recording head includes a heat source (e.g., laser diode) that directs energy to a magnetic disk via optical components integrated into the recording head. The energy creates a hotspot on the disk, lowering its magnetic coercivity and allowing a write pole to set magnetic orientation at the hotspot. After cooling, the relatively high coercivity of the disk prevents data from randomly changing orientation due to what is known as the superparamagnetic effect.

One of the optical components used in a HAMR recording head is referred to as a near-field transducer (NFT), although this component may sometimes be referred to as a plasmonic transducer, a near-field antenna, etc. An NFT is typically an element (e.g., disk, peg, aperture) made of a metal such as gold, although other materials may be used. An NFT generates surface plasmons in response to illumination by the light source, and these plasmons are shaped and directed to the disk surface. An NFT is used instead of conventional optics (e.g., lenses) because conventional optics are diffraction limited at the wavelengths of commonly available light sources.

In order to achieve the temperature increase needed at the disk surface, a significant amount of energy is imparted to the NFT, which can damage it over time. Because of this, some NFT designs use high melting point materials to achieve desired lifetime as measured in write power on hours (WPOH). The problem with this approach is that the high melting point materials may not be optimal for achieving the highest areal densities. An approach is described below that allows for providing both improved life and the desired WPOH capability With HAMR technology, the ability to write the high areal densities is influenced by the thermal gradient that is applied to the media. Higher thermal gradients allow for writing the highest linear densities. Similarly, high thermal gradients provide for the best cross track performance and limits the amount of adjacent track interference so that, with higher thermal gradients, the drive may utilize higher track densities. Together the higher linear density and track density provide for increased areal densities and drive capacities. A further benefit of higher thermal gradients is that the impact of mode hops cab be reduced. Mode hops are optical instabilities in the system that can result in occasional surges or drops in optical power applied to the disk, which can shift the bit transition locations. With high thermal gradients, the effects of mode hops are reduced because the shift in data is inversely proportional to the thermal gradient.

In embodiments described herein, a drive includes first and second HAMR writers that write to the same surface of a disk. The first and second HAMR writers may be in different head-gimbal assemblies (HGAs) (e.g., on different actuator arms that access the same disk surface), in multiple head structures that are mounted on the same HGA, or may be both integrated into a single head. The writers are configured to be used at different stages of life of the drive. For example, the second writer might not be used to write to the disk during an initial time period that extends from a first time when the disk drive is first used or fielded to a second time when a near-field transducer of the first HAMR writer reaches a first threshold. During a final period after the initial time period, the disk is written to using the second HAMR writer and not the first HAMR writer. This concept may be extended to more than two HAMR writers that write to the same surface.

In FIG. 1, a plan view shows parts of a data storage device 100 according to an example embodiment. A magnetic disk 102 is driven by a spindle motor 104. An actuator arm 106 is held over the disk 102 and moved to different radial locations via an actuator, e.g., voice coil motor 110. A head-gimbal assembly (HGA) 108 is located at the end of the arm 106 and used to read data from and write data to the disk 102. The HGA 108 may include one or more heads with integral HAMR write transducers.

Figure 2:
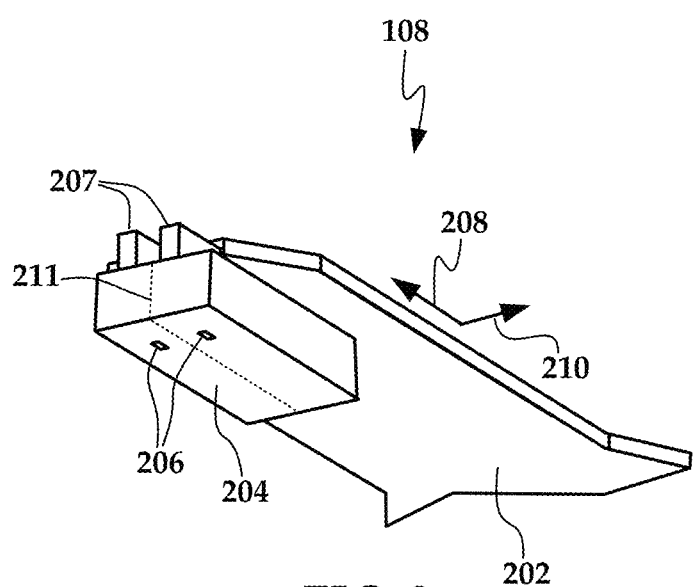
FIG. 2 is a perspective view of a head-gimbal assembly according to an example embodiment.

In FIG. 2, a perspective view of the HGA 108 shows a multiple HAMR writer arrangement according to an example embodiment. A gimbal 202 provides physical support, e.g., a suspension, for a head 204. The gimbal 202 also includes signal lines, e.g., a flex circuit that facilitates electrical coupling of the head 204 to a control board (not shown). The head 204 includes two or more write transducers 206 that may be offset from each other in a downtrack direction 208 and/or a crosstrack direction 210. The write transducers 206 are HAMR writers, and so activated one or more lasers 207 or other energy source.

Note that while the writer transducers 206 are shown integrated into a single head 206, a similar structure may use more than one head structure on the HGA 108. As indicated by dashed line 211, two separately formed heads (which may each include separate lasers 207) may be assembled together and mounted to the gimbal 202. Each head formed in this way may have a separate set of interconnects that couple to a flex circuit on the arm. While the method of manufacture may differ between embodiments with a single head and embodiments with multiple heads on a single HGA, the operation of both embodiments (e.g., activation of read/write transducers, servo control, clearance control) may be implemented in a similar fashion.

Generally, the NFT materials which provide for the highest thermal gradients are noble metals such as gold or silver. These noble metals have relatively low melting points, and therefore may have relatively low WPOH capability. As drive capacities increase the users, generally, write more data to the hard drive which requires greater WPOH to fill the available space. As an example, assume that a drive should be able to write 3.75PB over the drive's five-year lifetime. For a 16 TB, 16-headed drive, this translates to each surface being written to for approximately 270 hours. A further requirement is that the drive level NFT failure rate be 1.35% at 3.75PB written. This translates to a 0.085% head/surface level failure rate at 270 write power on hour (WPOH).

Figure 3:
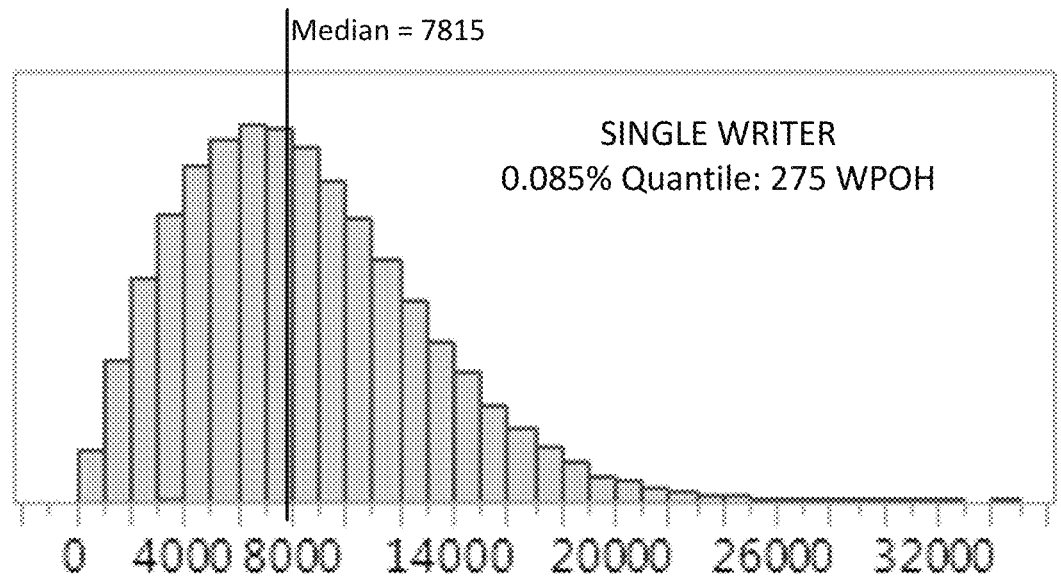
FIGS. 3-6 are graphs showing failure simulations on recording heads according to various embodiments.

In FIG. 3, a graph shows results of a Monte Carlo simulation of a head failure rate assuming a Weibull distribution with slope (β) of 2. Further, for this simulation, the location parameter (α) was set to 9400 hours so that the failure rate would be 0.085% at approximately 270 hours. This would require an NFT structure that has a median WPOH capability of ~7800 hours. This level of life requirement, with current technology, requires the use of high melting point materials for the NFT structure, e.g., Rh or Ir. However, if there are two write transducers sharing the load, the per surface write failure rate can be estimated as the random addition from two Weibull populations, assuming the failure rates of the NFTs are independent. In order to write for 270 hours per surface, the location parameter for the two populations is estimated for using a simulation, the results of which are in FIGS. 4-6.

Figure 4:
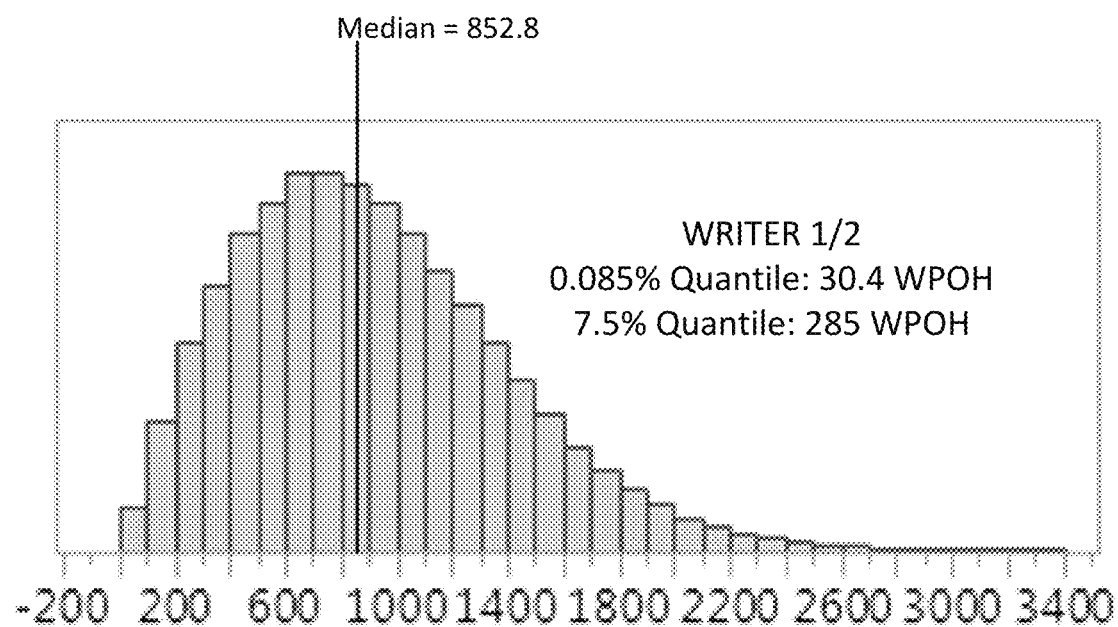
Figure 5:
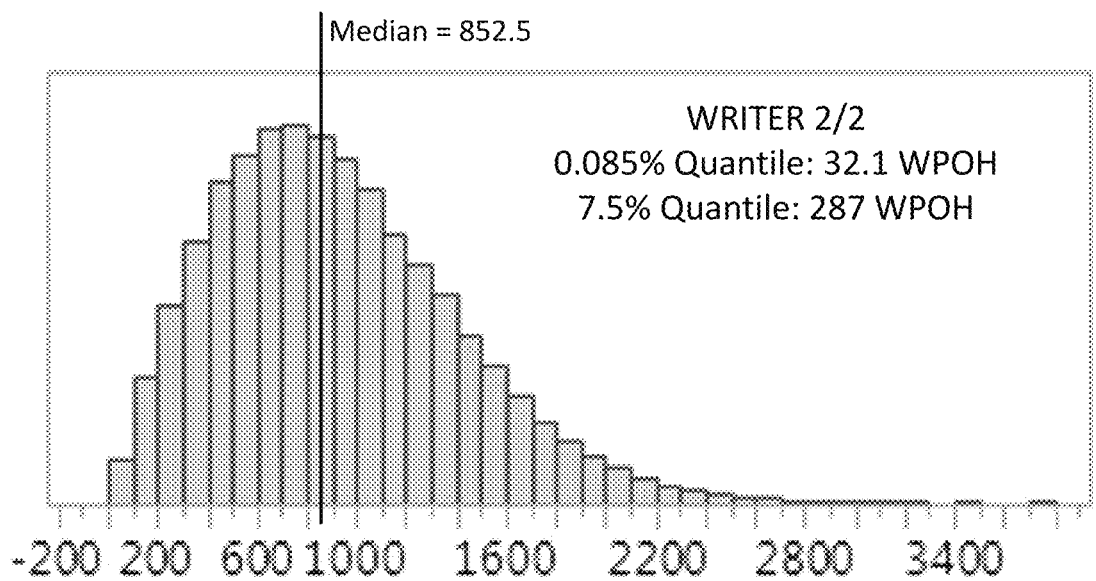

The charts in FIGS. 4 and 5 show the NFT failure rates for a Weibull distribution with β=2 and α=1025 for two similar writers. For this distribution of write power on hour lifetime the 0.085% failure rate is only about 30 hours which is well below the required value. In fact, this data indicates the 270 hours failure rate would about 7% if there were only one NFT available to write the data. At this failure rate every drive would be expected to have at least one failed NFT at the 3.75PB written goal.

Figure 6:
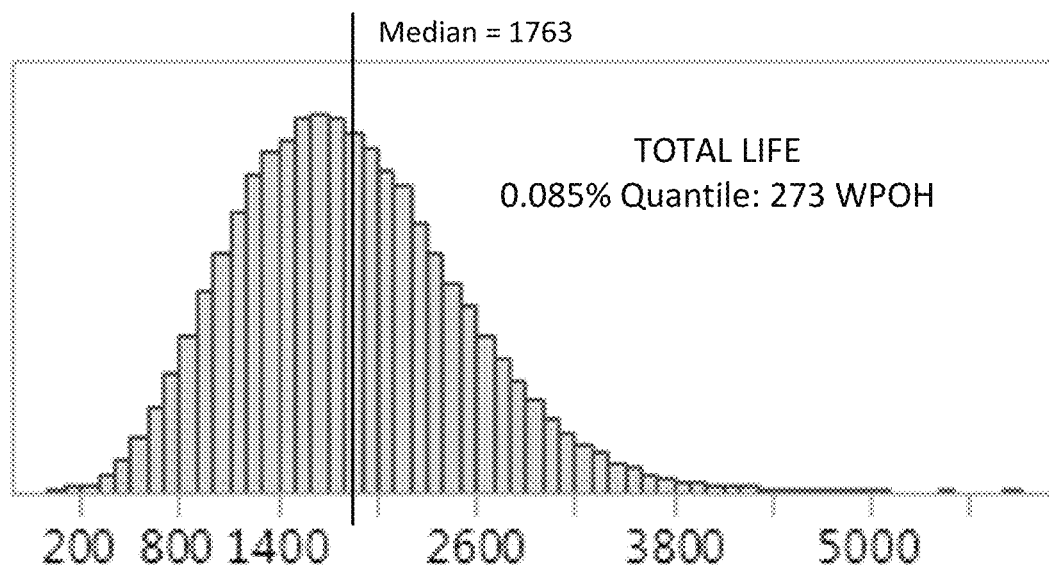

The chart in FIG. 6 shows the benefit of having two writers that share writing of data to the same surface. This is random addition of two heads from the populations shown in the first two charts. In this case both NFTs would have to fail for the surface to be considered failed. What can be seen in FIG. 6 is that with shared writing of data there is a per surface failure rate of 0.085% at the target of 270 write power on hour per surface. For this case, with shared data, the median write power on requirement would be 850 hours per NFT. This is only 11% of that required if there were one head per surface. This is a significant reduction in the life requirement on a per-head basis and would allow for selecting materials which can provide improved thermal gradient and areal density than would be allowed if there were only one head per surface. Current best estimates suggest a gold NFT has a 30% ADC advantage over the high melting point NFT materials.

In principle it would be possible to write with both heads at the same time, however it may not be best for improving the ADC capability of the drive. The reason for this is that both heads would need to be set to the same bits-per-inch (BPI) and tracks-per-inch (TPI), also referred to as linear bit density and track density. Note that the combination of BPI and TPI can be expressed as a bit aspect ratio (BAR), which is a ratio between the width of the track versus a nominal length of the bits along the track. In some cases, this would not provide for achieving the highest ADC as the minimum TPI and BPI of either head would be picked for both heads. Often a head with low TPI capability has high BPI capability and vice versa. Thus, if each head could be independently set to the best combination of BPI and TPI, ADC can be maximized.

One way to manage the different formats would be to leverage the zone structure that has been defined for zone block devices. One could then write with one head until it started to show signs of approaching failure at which point the data layout could be converted to that of the second head. This could be accomplished in a zone by zone manner with writes to unconverted zone using the "old" head and writes to converted zones using the "new" head. There would be some number of zones in a transition state that could be managed via a cache structure. Further, by using this method, the as-shipped drive could be set-up to initially write with the head that has the higher linear bit density (BPI) capability. This would provide a new drive with the highest possible large block and sequential performance. This would be useful for drives that change their target use case (warm-to-cold storage) as the drive ages.

In cases where there is a desire to have constant performance over the drive lifetime it would be possible to mix the high and low data rate heads, by surface, so the performance would stay more constant. For example, the first writer could write to an outer track zone but have lower linear bit density than the second writer, which writes to an inner track zone.

This might be useful for drives that have unknown use case or one that is expected to provide hot and cold data storage randomly over its lifetime.

Figure 7:
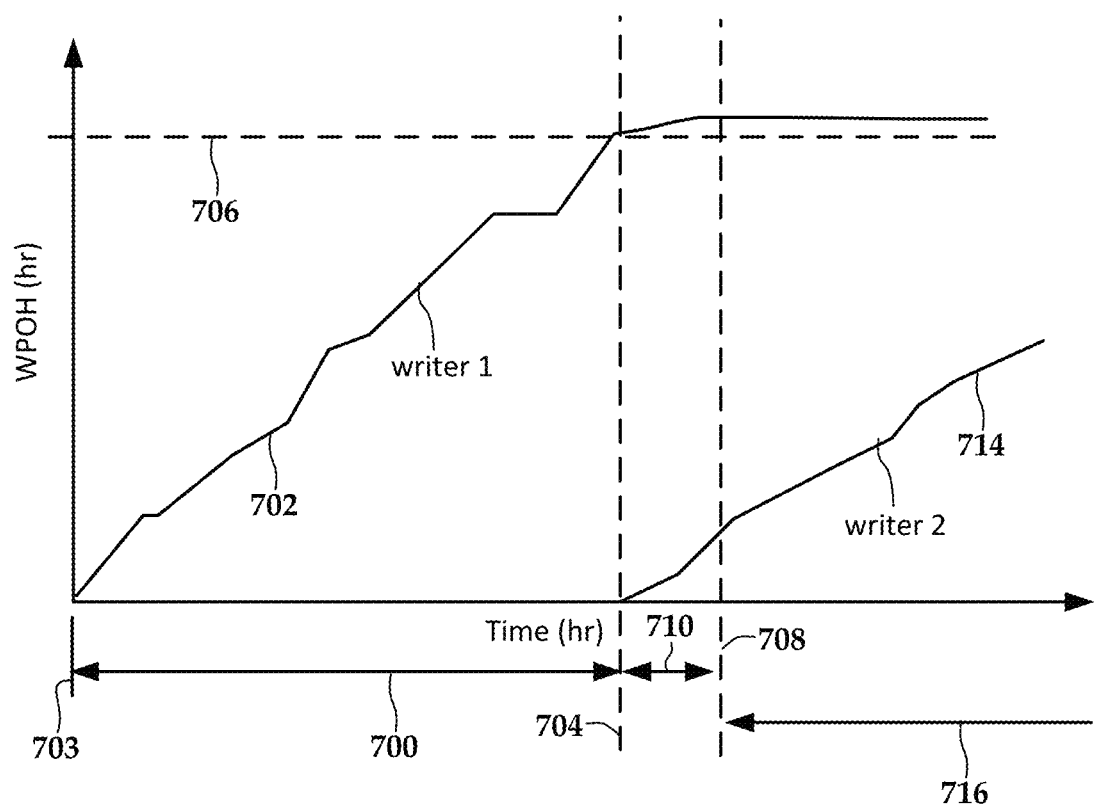
FIG. 7 is a graph showing a use case applied to multiple writers according to an example embodiment.

In FIG. 7, a graph shows how a drive may transition between one of multiple writers on a common HGA according to an example embodiment. Two writers (writer 1 and 2) are shown here, although the concept may apply to more than two writers. During an initial time period 700 from a first time 703 to a second time 704, only writer 1 writes data to the disk, as indicated by WPOH curve 702. At the second time 704, writer 1 has reached a target WPOH 706, which is indicative of some probable amount of remaining life (e.g., at least x % life remaining with y % confidence). Note that first time 703 may be when the drive is first fielded, e.g., when the end-user installs the drive and performs initialization functions (e.g., sets up partitions, formats the partitions, etc.). The writers will have been used for some amount of time in the factory prior to fielding, e.g., for calibration and qualification testing. However, this amount of use will generally be negligible when compared to the target WPOH 706. Nonetheless, the first time 703 may be measured from when writer 1 is first activated in the factory after being integrated into the drive assembly.

At the second time 704, writer 2 is brought into operation as indicated by curve 714. After the second time 704, writer 2 takes over most of the write requests, although during intermediate time period 710 between the second time 704 and a third time 708, both writers may be in used, as seen in a slight increase in curve 702 after the second time. During a subsequent time period 716 that starts at the third time 708, only writer 2 is used as seen by the flattening of curve 702.

Note that additional transitions may occur where the writers are switched on or off during the life of the drive. For example, if writer 2 reaches WPOH threshold 706 during subsequent time period 716, then writer 1 may be brought back into use again instead of or addition to using writer 2, with the assumption that one or both writers may still have some life remaining. Similarly, if writer 2 fails before it reaches WPOH threshold 706, then writer 1 may be brough back online to enable the drive to keep writing to the surface over which writers 1 and 2 operate. Note that even during times when the writers 1 or 2 are not being used, other components on the head (or HGA) may be regularly used over the life of the drive, such as different first and second readers that are formed integral to the heads with the two writers.

Figure 8:
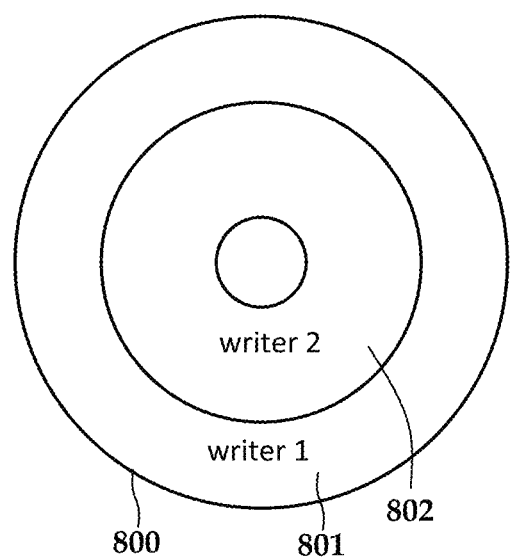
FIG. 8 is a diagram showing disk zones according to an example embodiment.

As noted above, each of the multiple writers used per disk surface may have different optimal BPI and TPI settings (thus different optimal BAR), and therefore the disk surface may be divided into zones. An example of this is shown in FIG. 8, which shows an arrangement of zones 801, 802 on a disk surface 800. In this example, zone 801 is used by writer 1 during the start of the drive life (e.g., period 700 shown in FIG. 7). Because this zone 801 encompasses the outermost tracks, write throughput (as well as read throughput) will be greater due to the greater linear speed relative to the head at a given rotation speed. Zone 802 encompasses inner tracks, and so will have lesser data throughput than zone 801. Note that there may be additional zones on the disk surface that may be accessible by one or both heads. For example, small zones with drive metadata (e.g., file system structures, partitioning information) or other data may be distributed throughout the surface and potentially within the zones 801, 802.

Note that the zones 801 and 802 may cover the same or different area. For example, setting the zones to cover an equal amount of area (and therefore store roughly an equal amount of data) may be a useful default if no information about the drives expected usage is known or assumed. In other cases, the zones 801 and 802 may be user-defined based on an expected use. In some scenarios, the definition of the zones 801 may 802 be changed dynamically based on current use conditions. For example, if writer 1 is nearing its WPOH threshold (e.g., threshold 706 in FIG. 7) and zone 1 is only 30% full, then zone 2 can be expanded outward to take over unused space from zone 1. This can increase the throughput performance of writer 2 when it comes online as it can take advantages of tracks closer to the outer diameter. Similarly, if zone 1 becomes full before nearing its WPOH threshold, then portions of zone 2 can be reallocated to zone 1.

Figure 9:
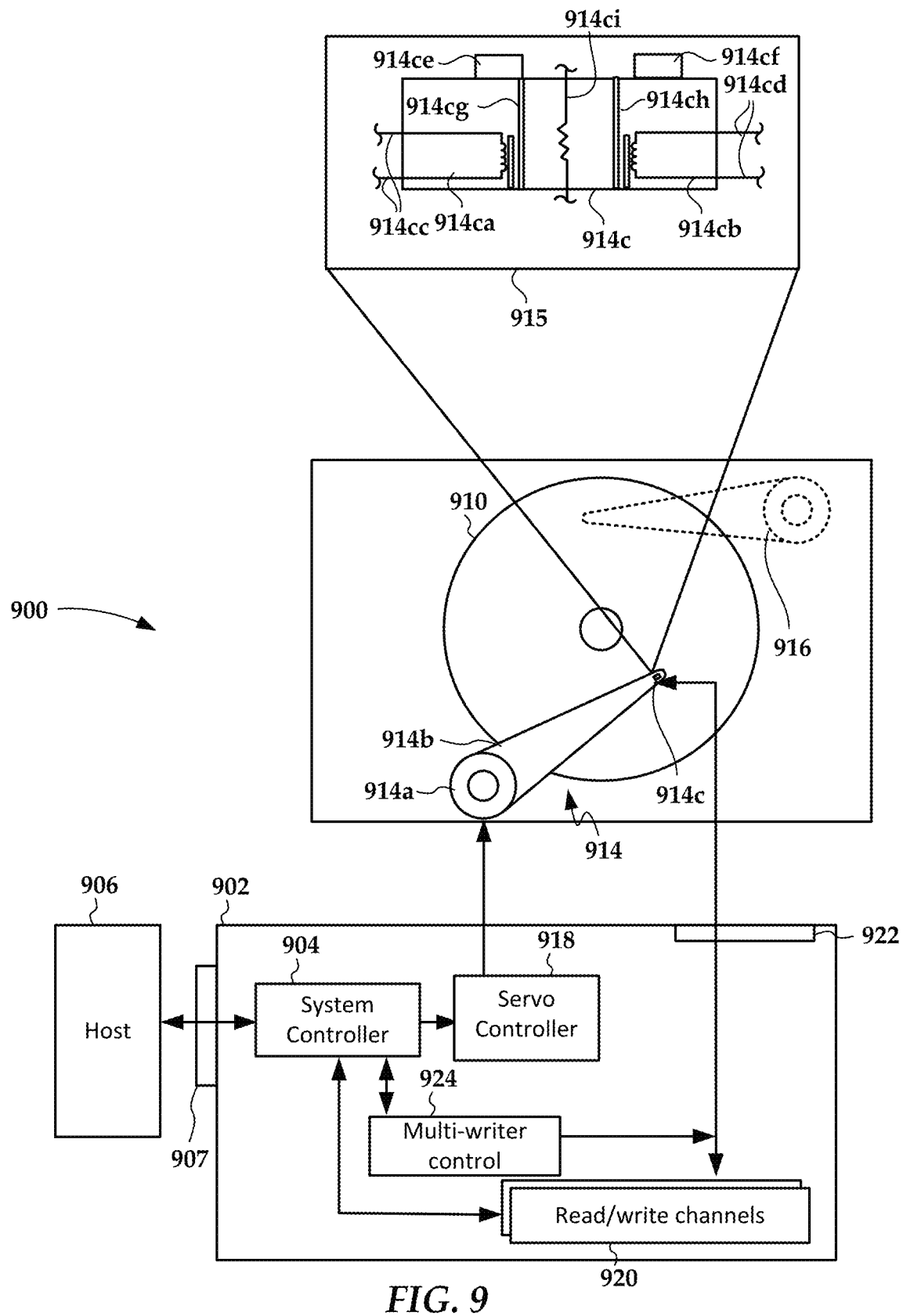
FIG. 9 is a block diagram of an apparatus according to an example embodiment.

In FIG. 9, a block diagram illustrates an apparatus 900 according to an example embodiment. The apparatus 900 includes circuitry 902 that facilitates writing data to and reading data from a magnetic disk 910. The circuitry 902 includes a system controller 904 that oversees operations of the apparatus 900. The system controller 904 may include a general-purpose central processing unit, application specific integrated circuit (ASIC), multi-function chipset, etc. Generally, the system controller 904 receives commands from a host 906 via a host interface 907. The host commands may include requests to load, store, and verify data that is targeted for the disk 910.

The apparatus 900 is shown with an actuator assembly 914 that includes a voice coil motor (VCM) 914a, arm 914b, and head gimbal assembly 914c. A servo controller 918 provides control signals to the VCM 914a using servo data obtained from a read element as feedback. One or more such read elements may be integrated with the head gimbal assembly 914c. As indicated in detail view 915, the head gimbal assembly 914c includes first and second magnetic writers 914ca, 914cb. Each of the writers 914ca, 914cb is shown with a respective write coil and pole that generate a magnetic field used for recording to the disk 910. The writers also include lasers 914ce, 914cf and optical paths 914cg, 914ch for HAMR writing.

Leads 914cc, 914cd are configured to deliver respective first and second write currents to the first and second writers 914ca, 914cb. The currents enable the first and second writers 914ca, 914cb to write to tracks of the magnetic disk 910. Two or more read/write channels 920 may be used to provide currents to the writers 914ca, 914cb during recording. The read/write channels 920 are coupled to the writers 914ca, 914cb (as well as other components on the head gimbal assembly 914c) via interface circuitry 912 such as preamplifiers, digital-to-analog converters, analog-to-digital converters, filters, etc. Similar leads (omitted for clarity) will also couple the lasers 914ce, 914cf to the interface circuitry 912 which deliver current to the lasers 914ce, 914cf as well as providing optical sensor signals (e.g., from a photosensor or bolometer).

A multi-writer control module 924 manages aspects of operating the writers 914ca, 914cb, such as selecting the writers 914ca, 914cb to write exclusively (and in some cases together) during different time periods during the life of the apparatus 900. The multi-writer control module 924 may manage aspects of the user data as it relates to zones that are exclusively dedicated to the individual writers 914ca, 914cb. The multi-writer control module 924 may also interact directly or indirectly with the read/write channels 920, e.g., specifying BAR for data depending on which writer will be used to write the data. Such information might also be useful during reading data that was previously written, e.g., for timing correction functions.

In some embodiments, the apparatus 900 may include a second actuator assembly 916 with components similar to that of actuator assembly 914. The actuator assembly 916 may have its own head-gimbal assembly (not shown) that accesses the same surface of the disk 910 as the actuator assembly 914. In some embodiments, one of the first and second writers 914ca, 914cb may be located on actuator assembly 914 and the other on actuator assembly 916. In such a configuration, one of the actuator assemblies 914, 916 and may not be used for writing to the disk surface for long periods of time, although both actuator assemblies 914, 916 could both be used during these periods for other purposes, e.g., for reading and/or for writing to other disk surfaces.

Figure 10:
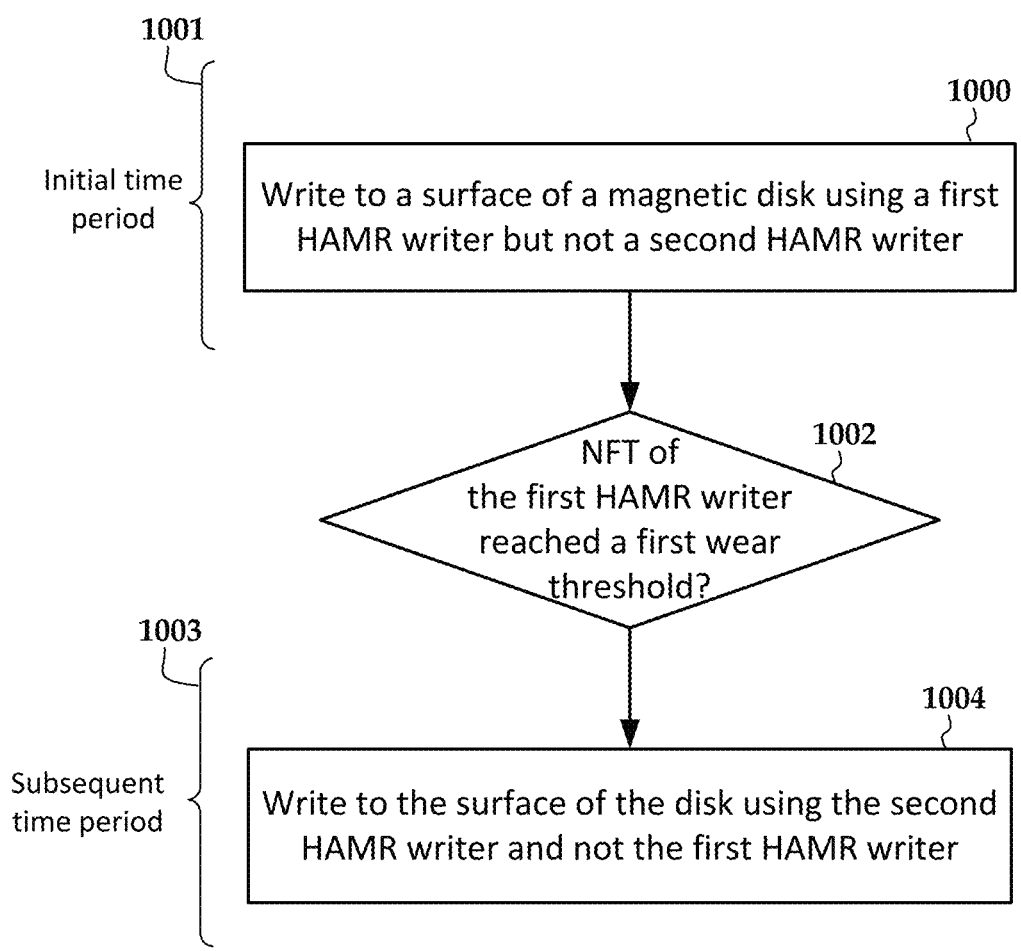
FIG. 10 is a flowchart of a method according to an example embodiment.

In FIG. 10, a flowchart shows a method according to an example embodiment. The method involves writing 1000 to a surface of a magnetic disk using a first HAMR writer during an initial time period 1001. A second HAMR writer is also configured to write to the surface but not during the initial time period 1001. The initial time period extends from a first time when the disk drive is first used to a second time when it is determined 1002 that a near-field transducer of the first HAMR writer reaches a first wear threshold. During a subsequent time period 1003 after the initial time period 1001, the surface of the disk is written to 1004 using the second HAMR writer and not the first HAMR writer.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   writing to a surface of a magnetic disk using a first heat-assisted magnetic recording (HAMR) writer during an initial time period, a second HAMR writer configured to write to the surface but not during the initial time period, the initial time period extending from a first time when the disk drive is first used to a second time when a near-field transducer of the first HAMR writer reaches a first wear threshold; and
   during a subsequent time period after the initial time period, writing to the surface of the disk using the second HAMR writer and not the first HAMR writer.

2. The method of claim 1, wherein the first and second HAMR writers are mounted on a single head-gimbal assembly.

3. The method of claim 2, wherein the first and second HAMR writers are integrated into a single recording head.

4. The method of claim 1, further comprising writing to the disk using the first and second HAMR writers during an intermediate time period between the first and second time periods.

5. The method of claim 1, wherein the first HAMR writer is selected based on the first HAMR writer having a higher linear bit density than the second HAMR writer.

6. The method of claim 1, wherein first regions written to by the first HAMR writer are marked as belonging to a first zone and second regions written to by the second HAMR writer are marked as belonging to a second zone, wherein different bit aspect ratios respectively optimized for the first and second HAMR writers are used to write data to the first and second zones.

7. The method of claim 6, wherein the first zone encompasses outer tracks of the disk and the second zone encompasses inner tracks of the disk.

8. The method of claim 7, wherein the first HAMR writer is selected based on the first HAMR writer having a lower linear bit density than the second HAMR writer.

9. The method of claim 1, further comprising, during the subsequent time period, determining that a near-field transducer of the second HAMR writer has failed, and in response thereto, using the first HAMR writer to subsequently write data to the disk.

10. An apparatus comprising:
    channel circuitry operable to communicate with first and second heat-assisted magnetic recording (HAMR) writers that are configured to write to a same surface of a magnetic disk; and
    a controller coupled to the channel circuitry and configured to:
       write to the surface of the magnetic disk using the first HAMR writer during an initial time period, the second HAMR writer not writing to the surface during the initial time period, the starting time period extending from a first time when the apparatus is first used to a second time when a near-field transducer of the first HAMR writer reaches a first wear threshold; and
       during a subsequent time period after the initial time period, write to the disk using the second HAMR writer and not the first HAMR writer.

11. The apparatus of claim 10, further comprising a single head-gimbal assembly that includes the first and second HAMR writers.

12. The apparatus of claim 11, further comprising a single recording head that houses the first and second HAMR writers.

13. The apparatus of claim 10, wherein first regions written to by the first HAMR writer are marked as belonging to a first zone that encompasses outer tracks of the disk and second regions written to by the second HAMR writer are marked as belonging to a second zone that encompasses inner tracks of the disk.

14. The apparatus of claim 12, wherein different bit aspect ratios that are respectively optimized for the first and second HAMR writers are used to write data to the first and second zones.

15. The apparatus of claim 14, wherein the first HAMR writer is selected based on the first HAMR writer having a lower linear bit density than the second HAMR writer.

16. A system comprising:
    a disk;

a head-gimbal assembly comprising first and second heat-assisted magnetic recording (HAMR) writers operable to write to the disk; and a processor coupled to the first and second HAMR writers and operable to:

write to the disk using the first HAMR writer but not the second HAMR writer during an initial time period after the drive is first used; and determine that a near-field transducer of the first HAMR writer reaches a first wear threshold, and in response thereto, write to the disk using the second HAMR writer and not the first HAMR writer during a subsequent time period after the initial time period.

17. The system of claim 16, wherein first regions written to by the first HAMR writer are marked as belonging to a first zone that encompasses outer tracks of the disk and second regions written to by the second HAMR writer are marked as belonging to a second zone that encompasses inner tracks of the disk.

18. The system of claim 17, wherein bit aspect ratios that are respectively optimized for the first and second HAMR writers are used to write data to the first and second zones.

19. The apparatus of claim 18, wherein the first HAMR writer is selected based on the first HAMR writer having a lower linear bit density than the second HAMR writer.

20. The system of claim 16, wherein the first and second HAMR writers are integrated into a single recording head.

\* \* \* \* \*